(12) United States Patent
Salter et al.

(10) Patent No.: US 11,904,665 B2
(45) Date of Patent: Feb. 20, 2024

(54) SWITCHABLE GLASS STRUCTURE FOR A VEHICLE

(71) Applicant: Ford Global Technologies, LLC, Dearborn, MI (US)

(72) Inventors: Stuart C. Salter, White Lake, MI (US); Hussein Berry, Dearborn, MI (US); Tom F. Boettger, Dearborn, MI (US); Paul Kenneth Dellock, Northville, MI (US); Harry Kon, South Lyon, MI (US); Terry Vandenbrink, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 17/098,759

(22) Filed: Nov. 16, 2020

(65) Prior Publication Data

US 2022/0153096 A1  May 19, 2022

(51) Int. Cl.
*B60J 3/04* (2006.01)
*B32B 17/10* (2006.01)

(52) U.S. Cl.
CPC .......... *B60J 3/04* (2013.01); *B32B 17/10036* (2013.01); *B32B 17/10174* (2013.01); *B32B 17/10504* (2013.01); *B32B 2307/412* (2013.01); *B32B 2605/00* (2013.01)

(58) Field of Classification Search
CPC .. B60J 3/04; B32B 17/10504; G06F 3/04842; G02F 1/13338
See application file for complete search history.

(56) References Cited

U.S. PATENT DOCUMENTS

| | | | |
|---|---|---|---|
| 9,365,161 B2 | 6/2016 | Mannheim Astete et al. | |
| 2013/0158790 A1* | 6/2013 | McIntyre, Jr. | B60J 3/04 |
| | | | 359/275 |
| 2017/0075153 A1* | 3/2017 | Chan | G06F 3/0446 |
| 2018/0011359 A1* | 1/2018 | De Jong | G02F 1/13338 |
| 2019/0160792 A1 | 5/2019 | Weber | |
| 2020/0108700 A1 | 4/2020 | Flanigan et al. | |
| 2020/0207188 A1* | 7/2020 | Jones | B60J 3/007 |

FOREIGN PATENT DOCUMENTS

| | | |
|---|---|---|
| CN | 101414065 A | 4/2009 |
| CN | 102785555 B | 8/2015 |
| CN | 111376684 A | 7/2020 |
| WO | 2014135467 A1 | 9/2014 |

* cited by examiner

*Primary Examiner* — Jessica M Merlin
(74) *Attorney, Agent, or Firm* — Vichit Chea; Carlson, Gaskey & Olds, P.C.

(57) ABSTRACT

An apparatus and method, according to an exemplary aspect of the present disclosure includes, among other things, a switchable glass structure supported within a vehicle and comprised of a plurality of layers. A power source is selectively applied to the switchable glass structure to change the switchable glass structure from opaque to clear. Markings are formed within at least one of the plurality of layers to identify user input areas. A control system includes a circuit configured cooperate with the power source to allow the switchable glass structure to act as a capacitive sensor such that user input to the user input areas can be sensed to change the switchable glass structure between opaque and clear modes.

22 Claims, 2 Drawing Sheets

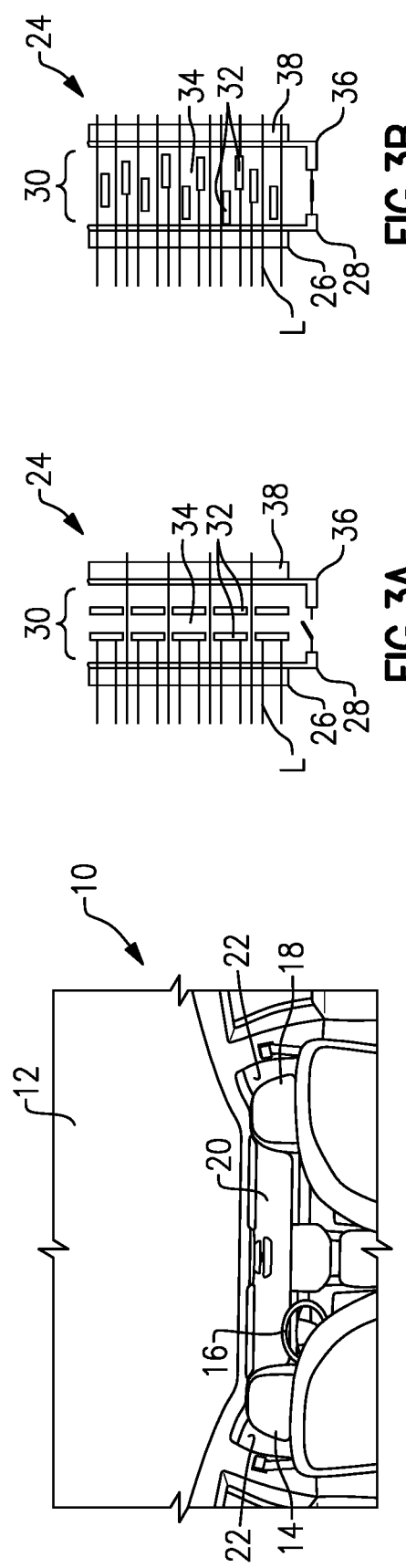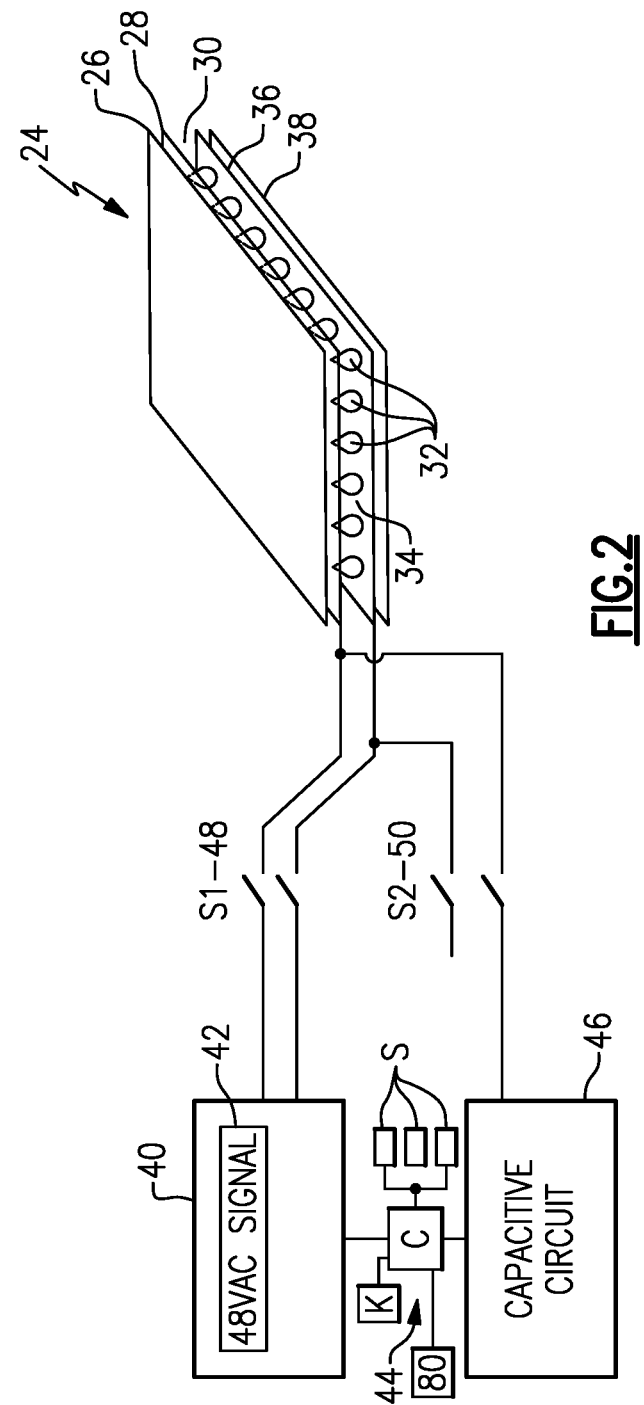

SWITCHABLE GLASS STRUCTURE FOR A VEHICLE

TECHNICAL FIELD

This disclosure relates generally to a switchable glass structure for a vehicle that acts as a capacitive sensor and includes integrally formed markings to identify user input areas to control operational modes of the switchable glass structure.

BACKGROUND

Vehicles include various glass panel structures such as skylights, windows, etc. As vehicles become more customized, it is important to provide adaptive features for glass panel structures to enhance interior and exterior lighting effects, and to improve driver and passenger comfort.

SUMMARY

An apparatus according to an exemplary aspect of the present disclosure includes, among other things, a switchable glass structure supported within a vehicle and comprised of a plurality of layers. A power source is selectively applied to the switchable glass structure to change the switchable glass structure from opaque to clear. Markings are formed within at least one of the plurality of layers to identify user input areas. A control system includes a circuit configured cooperate with the power source to allow the switchable glass structure to act as a capacitive sensor such that user input to the user input areas can be sensed to change the switchable glass structure between opaque and clear modes.

In a further non-limiting embodiment of the foregoing apparatus, the switchable glass structure comprises a polymer dispersed liquid crystal (PDLC) that includes at least one Indium Tin Oxide (ITO) layer, and wherein the markings are formed within the ITO layer.

In a further non-limiting embodiment of any of the foregoing apparatus, the markings are carved out of the ITO layer to leave open gaps that show up in white on the switchable glass structure, and when the switchable glass structure turns opaque an area around the markings is energized to create a reverse image to allow the markings to be visible.

In a further non-limiting embodiment of any of the foregoing apparatus, at least one light source is provided, and wherein the markings are carved out of the ITO layer to leave open gaps forming an opaque area that acts as a reflector for the light source that provides illumination along an edge of the switchable glass structure allowing the markings to illuminate.

In a further non-limiting embodiment of any of the foregoing apparatus, separation markings are included to divide the switchable glass structure into a plurality of discrete glass panels.

In a further non-limiting embodiment of any of the foregoing apparatus, each discrete glass panel includes markings for at least one user input area, and/or the control system automatically switches one or more of the discrete glass panels to avoid direct sunlight on occupants.

In a further non-limiting embodiment of any of the foregoing apparatus, the circuit includes at least a first switch and a second switch, wherein the first switch is normally closed and the second switch is normally open to allow a signal from the power source to reach the switchable glass structure and make the switchable glass structure clear, and wherein a capacitive measurement is taken when the signal goes to zero and the first switch is opened and the second switch is closed such that the capacitive measurement can be taken to determine if a user is interacting with the user input areas.

In a further non-limiting embodiment of any of the foregoing apparatus, a light sensor communicates light measurement data to the control system, and wherein the control system adjusts between opaque and clear settings dependent on light measurement.

In a further non-limiting embodiment of any of the foregoing apparatus, at least one temperature sensor communicates interior and/or exterior temperature data to the control system, and wherein the control system adjusts between opaque and clear settings dependent on temperature measurements.

In a further non-limiting embodiment of any of the foregoing apparatus, the control system includes an automatic privacy setting where an opaque state is set when the control system determines it is dark outside the vehicle using a light sensor and identifies that interior lighting is on, or the control system determines that people are surrounding the vehicle using an exterior camera or detecting exterior wireless phone signals while a user is inside the vehicle.

In a further non-limiting embodiment of any of the foregoing apparatus, when a user approaches the vehicle and the control system detects a key signal or user wireless phone signal within a predetermined proximity, the control system changes the switchable glass structure to opaque to form a reflector to increase effectiveness of interior lights.

In a further non-limiting embodiment of any of the foregoing apparatus, the switchable glass structure comprises a sky light.

In a further non-limiting embodiment of any of the foregoing apparatus, the switchable glass structure comprises one or more vehicle side windows.

A method according to still another exemplary aspect of the present disclosure includes, among other things: providing at least one vehicle glass panel that comprises a PDLC that includes at least one ITO layer; selectively applying power to the vehicle glass panel to change the vehicle glass panel from opaque to clear; forming markings within the ITO layer to identify user input areas; and controlling a circuit to allow the switchable glass structure to act as a capacitive sensor such that user input to the user input areas can be sensed to change the vehicle glass panel between opaque and clear modes.

In a further non-limiting embodiment of the foregoing method, the method includes carving the markings out of the ITO layer to leave open gaps that show up in white on the switchable glass structure, and energizing an area around the markings when the vehicle glass panel turns opaque to create a reverse image to allow the markings to be visible, and/or carving the markings out of the ITO layer to leave open gaps forming an opaque area that acts as a reflector for a light source that provides illumination along an edge of the vehicle glass panel allowing the markings to illuminate.

In a further non-limiting embodiment of any of the foregoing methods, the method includes forming separation markings in the ITO layer to divide the vehicle glass panel into a plurality of discrete glass panels that can be separately controlled.

In a further non-limiting embodiment of any of the foregoing methods, the circuit includes at least a first switch and a second switch, wherein the first switch is normally closed and the second switch is normally open to allow a signal from a power source to reach the vehicle glass panel and make the vehicle glass panel clear, and including taking a capacitive measurement when the signal goes to zero and the first switch is opened and the second switch is closed such that the capacitive measurement can be taken to determine if a user is interacting with the user input areas.

In a further non-limiting embodiment of any of the foregoing methods, the method includes adjusting between the opaque and clear modes dependent on external or internal light measurement, and/or adjusting between the opaque and clear modes dependent on external or internal temperature measurement.

In a further non-limiting embodiment of any of the foregoing methods, the method includes providing an automatic privacy setting where the opaque mode is activated when it is dark outside and interior lighting is on, or when people are detected outside the vehicle while a user is inside the vehicle, and/or switching to the opaque mode when a key signal or user wireless phone signal is detected within a predetermined proximity to the vehicle.

In a further non-limiting embodiment of any of the foregoing methods, the vehicle glass panel comprises a sky light and/or one or more vehicle side windows.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a switchable glass structure in a vehicle.

FIG. 2 is a schematic representation of the switchable glass structure comprising a PDLC and acting as a capacitive sensor.

FIG. 3A shows a power off condition for the PDLC where the switchable glass structure is in an opaque mode.

FIG. 3B shows a power on condition for the PDLC where the switchable glass structure is in a clear mode.

DETAILED DESCRIPTION

Figure 5A:
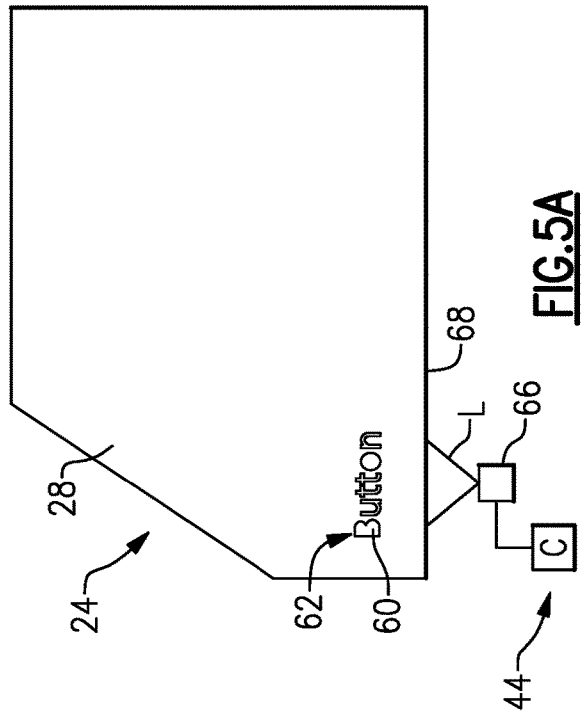
FIG. 5A shows another example of a user input configuration for the switchable glass structure.

This disclosure details an exemplary switchable glass structure for a vehicle that acts as a capacitive sensor and includes integrally formed markings to identify user input areas to control operational modes of the switchable glass structure.

FIG. 1 shows a vehicle 10 with a skylight 12 covering a top of the vehicle 10. The vehicle 10 also includes a driver seat 14 facing a steering wheel 16 and a passenger seat 18 that is next to the driver seat 14. The seats 14, 18 face a windshield 20 and side windows 22 are located next to the driver 14 and passenger 18 seats.

In one example, one or more of the skylight 12, windshield 20, and side windows 22 comprises a switchable glass structure that can change between clear and opaque modes. In one example shown in FIG. 2, the switchable glass structure comprises a polymer dispersed liquid crystal (PDLC) 24 that is comprised of a plurality of layers. In one example, the plurality of layers includes at least: a polyethylene terephthalate (PET) film layer 26, e.g. a plastic film layer; an Indium Tin Oxide (ITO) layer 28; a layer 30 of liquid crystals 32 suspended in a polymer 34; another ITO layer 36; and another PET film layer 38. The PDLC 24 is positioned between layers of glass G (FIG. 5B).

A power source 40 supplies power to the PDLC 24 to change between the clear and opaque modes. The power source 40 is selectively applied to the switchable glass structure to change between modes in response to certain conditions and/or user requests. In one example, the power source 40 applies a 48 VAC signal 42 as shown in FIG. 2. The liquid crystal microdroplets 32 are used to reflect light L away from the surface as shown in FIG. 3A, which distorts the state of the glass to present as frosted/white. When an electrical current from the power source 40 is passed through the layers of the PDLC 24, the liquid crystal microdroplets 32 polarize as shown in FIG. 3B, which allows light L to pass through the glass and give a clear appearance.

In one example, a control system 44 with a controller C includes a circuit 46 that is configured cooperate with the power source 40 to allow the PDLC 24 of the switchable glass structure to act as a capacitive sensor such that user input can be sensed to change the switchable glass structure between the opaque and clear modes. In one example, the circuit 46 includes at least a first switch 48 and a second switch 50. The first switch 48 is normally closed and the second switch 50 is normally open to allow the signal 42 from the power source 40 to reach the PDLC 24 and make the switchable glass structure clear. The system 44 can take a capacitive measurement when the signal goes to zero and the first switch 48 is opened and the second switch 50 is closed such that the capacitive measurement can be taken to determine if a user is interacting with user input areas on the PDLC 24. In one example, the glass takes about 300 ms to change from opaque to clear, while a capacitive measurement takes 5 ms. This means there is time to turn off the 48 VAC signal 42 (the signal goes to zero) that keeps the glass clear and take a capacitive measurement using the ITO in the film, and then turn the 48 VAC signal 42 back on before any noticeable change takes place in the glass.

Figure 4A:
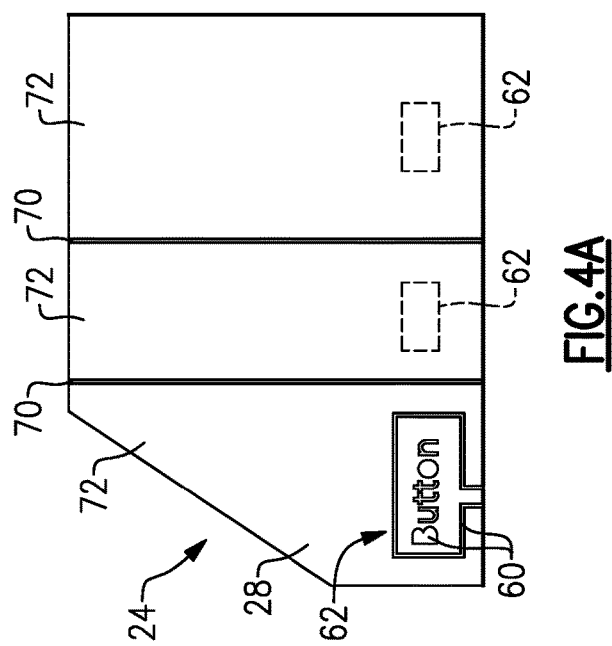
FIG. 4A shows one example of a user input configuration for the switchable glass structure.

In one example, markings 60 are formed within the ITO layer 28 to identify user input areas 62 as shown in FIG. 4A. The control system 44 cooperates with the circuit 46 and power source 40 to sense user input to the user input areas 62 and accordingly change the switchable glass structure between opaque and clear modes as commanded.

The controller C can be a dedicated controller or part of another vehicle control system. The controller C can include a processor, memory, and one or more input and/or output (I/O) device interface(s) that are communicatively coupled via a local interface. The local interface can include, for example but not limited to, one or more buses and/or other wired or wireless connections. The controller C may be a hardware device for executing software, particularly software stored in memory. The software in the memory may include one or more separate programs, each of which includes an ordered listing of executable instructions for implementing logical functions, and which can change the switchable glass structure between opaque and clear modes based on various inputs and operational conditions.

Figure 4B:
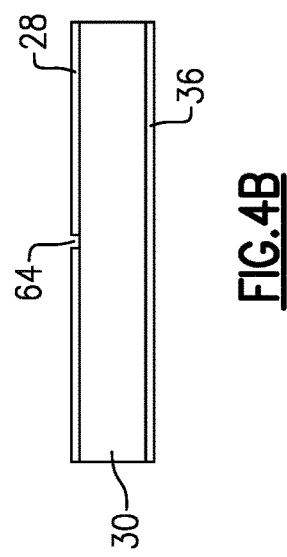
FIG. 4B is a section view of FIG. 4A.

In one example, the markings 60 are carved out of the ITO layer to leave open gaps 64 that show up in white on the PDLC 24 as shown in FIG. 4B. When the PDLC 24 turns opaque, an area around the markings 60 is energized via the control system and power source to create a reverse image to allow the markings 60 to be visible on the clear glass.

Figure 5B:
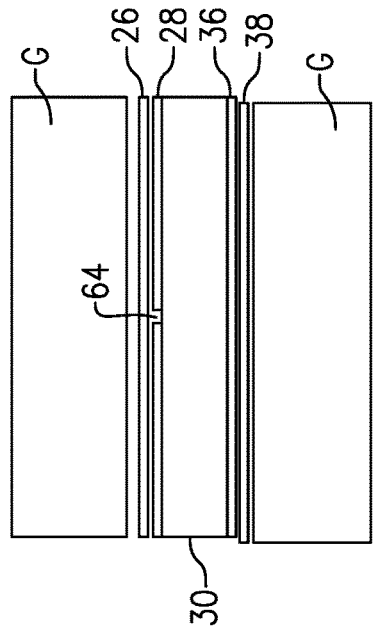
FIG. 5B is a section view of FIG. 5A.

In another example, the markings 60 are carved out of the ITO layer 28 to leave open gaps 64 to identify the user input areas 62 as shown in FIG. 5A. In this example, the gaps form an opaque area that acts as a reflector for a light source 66 that provides illumination along an edge 68 of the PDLC 24 allowing the markings 60 to illuminate. In one example, an LED light source is used; however, any type of light source 66 can be used to provide the illumination. The light source is controlled by the control system 44 as known.

In one example, if a user were to touch the glass to make it opaque and then touch the glass again, the edge lighting could turn on to allow the glass to become a dome light. Optionally, there could be a specific user input area to go directly into a dome light mode.

The markings 60 can be formed in any type of configuration to identify a user input area 62. For example, the markings 60 could be formed to mimic a button shape or a switch shape.

In another example, separation markings 70 are carved out of the ITO layer to leave open gaps 64 that show up in white as shown in FIG. 4A. These markings 70 divide the PDLC 24 of the switchable glass structure into a plurality of discrete glass panels 72. In one example, the panels 72 can be controlled via a common user input area 62, or each discrete glass panel 72 could include markings 60 for a dedicated user input area 62.

The white lines shown in the figures indicate a gap in the ITO. A small gap in the ITO makes a virtually invisible line while a large gap makes an opaque line. One advantage of using markings in the ITO is the ability of it to be laid down in very thin traces, e.g. minimum ITO feature size: 50 μm, with no bleeding or migration, such as would occur with the use of conductive ink. As such, the buttons or panels could be placed anywhere in the glass. In one example, the capacitive touch electronics/user input module is placed close to the bottom of the glass to minimize the parasitic capacitances which make recognizing a touch more difficult. Thus, if a person touches a user input section of the glass it could go clear or opaque, and these user input areas could be anywhere in the glass.

In one example of a skylight configuration, the control system 44 automatically switches one or more of the discrete glass panels 72 to avoid direct sunlight on occupants. A temperature or light sensor S (FIG. 2), for example, can communicate with the controller C to determine when to make the change for occupant comfort. This can be either measured directly from various light sensors/cameras to determine sunlight levels and/or calculated by GPS/position of sun/time of year versus each seating position.

In one example, the light sensor S can comprise a day/night sensor that communicates light measurement data to the control system 44 to adjust between opaque and clear modes dependent on light measurement. The light sensor S could also include exterior and interior light sensors to measure exterior and interior light levels.

In one example, the temperature sensor S communicates interior and/or exterior temperature data to the control system 44 to adjust between opaque and clear settings dependent on temperature measurements. The control system 44 can change modes based on temperature or outside light in a variable mode with a difference for moving and stationary. A skylight/glass panel can also be cleared to warm the interior on sunny days in the winter while parked unattended. The skylight can also be placed in the opaque mode to limit interior temperature while the vehicle is parked and unattended.

In another example, the control system 44 can include an automatic privacy setting where an opaque state is set when the control system 44 determines it is dark outside using an exterior light sensor S, and identifies that interior lighting is on using an interior light sensor S. Optionally, the automatic privacy setting can be set when the control system uses an exterior camera 80 (FIG. 2) to determine that people are surrounding the vehicle or by detecting close-by exterior wireless phone signals while a user is inside the vehicle 10. Optionally, rack mounted lighting can be reflected to illuminate the glass while also making the glass glow gently on the interior. Thus, the PDLC 24 can work as reflector for an interior lighting sconce when the vehicle is stopped, and when the vehicle is placed in gear, PDLC 24 goes clear.

In another example, when a user approaches the vehicle 10 and the control system 44 detects a key signal K or a user wireless phone signal within a predetermined proximity, the control system can change the switchable glass structure to opaque to form a reflector to increase effectiveness of interior lights.

In another example, the glass can turn a different color, such as red for example, when a vehicle door is open at night while the vehicle is stopped along a road. Optionally, the LEDS can be overdriven at 2-3 times in a pulsed manner to make the door more visible.

In another example, the vehicle can include a stowable steering wheel 16 moveable between an operational position and a stowed position. When the steering wheel is stowed to provide a desk or workspace area, the control system 44 can switch the skylight to the opaque mode.

In another example, for autonomous and/or electric vehicles, the control system 44 can include a setting based on seat position such that when the seat position is laid back during a charging or autonomous driving mode, window settings can be in the opaque mode.

The subject disclosure provides several benefits for using a PDLC 24 such as providing transparency or privacy instantaneously at will. There is also improved noise reduction, low power consumption, e.g. 24 VA/m2, and 99% of UV light is filtered. The PDLC 24 also acts as a capacitive sensor and includes integrated user input areas 62 to control the PDLC 24 in the glass G. The user input areas 62 can be visible with reverse imagery or by using side/edge illumination to accommodate energized and unenergized states. There is the additional benefit of selective and/or automatic control based on various situations/inputs.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a switchable glass structure supported within a vehicle and comprised of a plurality of layers;
a power source that is selectively applied to the switchable glass structure to change the switchable glass structure from opaque to clear;
markings formed within at least one of the plurality of layers to identify user input areas; and
a control system that includes a circuit configured to cooperate with the power source to allow the switchable glass structure to act as a capacitive sensor such that user input to the user input areas is able to change the switchable glass structure between opaque and clear modes, and wherein a signal is generated by the control system to control the switchable glass structure in response to user input to the user input areas, and wherein the control system is configured to make a capacitive measurement when the signal goes to zero to determine if a user is interacting with the user input areas.

2. The apparatus according to claim 1, wherein the switchable glass structure comprises a polymer dispersed liquid crystal (PDLC) that includes at least one Indium Tin Oxide (ITO) layer, and wherein the markings are formed within the ITO layer.

3. The apparatus according to claim 2, including at least one light source, and wherein the markings are carved out of the ITO layer to leave open gaps forming an opaque area that acts as a reflector for the light source that provides illumination along an edge of the switchable glass structure allowing the markings to illuminate.

4. The apparatus according to claim 2, including separation markings to divide the switchable glass structure into a plurality of discrete glass panels.

5. The apparatus according to claim 4, wherein each discrete glass panel includes markings for at least one user input area, and/or the control system automatically switches one or more of the discrete glass panels to avoid direct sunlight on occupants.

6. The apparatus according to claim 2, wherein the circuit includes at least a first switch and a second switch, wherein the first switch is normally closed and the second switch is normally open to allow the signal from the power source to reach the switchable glass structure and make the switchable glass structure clear, and wherein the control system is configured to make the capacitive measurement when the signal goes to zero and the first switch is opened and the second switch is closed such that the capacitive measurement can be taken to determine if the user is interacting with the user input areas.

7. The apparatus according to claim 2, including a light sensor that communicates light measurement data to the control system, and wherein the control system adjusts between opaque and clear settings dependent on light measurement.

8. The apparatus according to claim 2, including at least one temperature sensor that communicates interior and/or exterior temperature data to the control system, and wherein the control system adjusts between opaque and clear settings dependent on temperature measurements.

9. The apparatus according to claim 2, wherein the control system includes an automatic privacy setting where an opaque state is set when
the control system determines it is dark outside the vehicle using a light sensor and identifies that interior lighting is on, or
the control system determines that people are surrounding the vehicle using an exterior camera or detecting exterior wireless phone signals while a user is inside the vehicle.

10. The apparatus according to claim 2, when a user approaches the vehicle and the control system detects a key signal or user wireless phone signal within a predetermined proximity, the control system changes the switchable glass structure to opaque to form a reflector to increase effectiveness of interior lights.

11. The apparatus according to claim 1, wherein the switchable glass structure comprises a sky light.

12. The apparatus according to claim 1, wherein the switchable glass structure comprises one or more vehicle side windows.

13. The apparatus according to claim 1, wherein the switchable glass structure comprises a polymer dispersed liquid crystal (PDLC) that includes at least one Indium Tin Oxide (ITO) layer, and wherein the switchable glass structure takes a first amount of time to change from opaque to clear and the capacitive measurement takes a second amount of time that is less than the first amount of time such that there is a sufficient amount of time to turn off power such that the signal goes to zero to keep the switchable glass structure clear and take the capacitive measurement using the at least one ITO layer and subsequently turning the power back on before a user detects that change takes place in the switchable glass structure.

14. An apparatus, comprising:
a switchable glass structure supported within a vehicle and comprised of a plurality of layers, wherein the switchable glass structure comprises a polymer dispersed liquid crystal (PDLC) that includes at least one Indium Tin Oxide (ITO) layer;
a power source that is selectively applied to the switchable glass structure to change the switchable glass structure from opaque to clear;
markings formed within the at least one ITO layer of the plurality of layers to identify user input areas, wherein the markings are carved out of the ITO layer to leave open gaps that show up in white on the switchable glass structure, and when the switchable glass structure turns opaque an area around the markings is energized to create a reverse image to allow the markings to be visible; and
a control system that includes a circuit configured to cooperate with the power source to allow the switchable glass structure to act as a capacitive sensor such that user input to the user input areas is able to change the switchable glass structure between opaque and clear modes.

15. A method, comprising:
providing at least one vehicle glass panel that comprises a PDLC that includes at least one ITO layer;
selectively applying power to the at least one vehicle glass panel to change the vehicle glass panel from opaque to clear;
forming markings within the at least one ITO layer to identify user input areas;
controlling a circuit to allow the at least one vehicle glass panel to act as a capacitive sensor such that user input to the user input areas is able to change the vehicle glass panel between opaque and clear modes; and
generating a signal to control the at least one vehicle glass panel in response to user input to the user input areas, and taking a capacitive measurement when the signal goes to zero to determine if a user is interacting with the user input areas.

16. The method according to claim 15, including forming separation markings in the ITO layer to divide the vehicle glass panel into a plurality of discrete glass panels that can be separately controlled.

17. The method according to claim 15, wherein the circuit includes at least a first switch and a second switch, wherein the first switch is normally closed and the second switch is normally open to allow the signal from a power source to reach the vehicle glass panel and make the vehicle glass panel clear, and including taking the capacitive measurement when the signal goes to zero and the first switch is opened and the second switch is closed such that the capacitive measurement can be taken to determine if the user is interacting with the user input areas.

18. The method according to claim 15, including adjusting between the opaque and clear modes dependent on external or internal light measurement, and/or adjusting between the opaque and clear modes dependent on external or internal temperature measurement.

19. The method according to claim 15, including providing an automatic privacy setting where the opaque mode is activated when it is dark outside and interior lighting is on, or when people are detected outside a vehicle while a user is inside the vehicle, and/or switching to the opaque mode when a key signal or user wireless phone signal is detected within a predetermined proximity to the vehicle.

20. The method according to claim 15, wherein the vehicle glass panel comprises a sky light and/or one or more vehicle side windows.

21. The method according to claim 15, wherein the at least one vehicle glass panel takes a first amount of time to change from opaque to clear and the capacitive measurement takes a second amount of time that is less than the first amount of time such that there is a sufficient amount of time to turn off power such that the signal goes to zero to keep the at least one vehicle glass panel clear and take the capacitive measurement using the at least one ITO layer and subsequently turning the power back on before a user detects that change takes place in the at least one vehicle glass panel.

22. A method, comprising:
providing at least one vehicle glass panel that comprises a PDLC that includes at least one ITO layer;
selectively applying power to the vehicle glass panel to change the vehicle glass panel from opaque to clear;
forming markings within the ITO layer to identify user input areas by carving the markings out of the at least one ITO layer to leave open gaps that show up in white on the at least one vehicle glass panel, and energizing an area around the markings when the vehicle glass panel turns opaque to create a reverse image to allow the markings to be visible, and/or carving the markings out of the at least one ITO layer to leave open gaps forming an opaque area that acts as a reflector for a light source that provides illumination along an edge of the at least one vehicle glass panel allowing the markings to illuminate; and
controlling a circuit to allow the at least one vehicle glass panel to act as a capacitive sensor such that user input to the user input areas is able to change the at least one vehicle glass panel between opaque and clear modes.

* * * * *